(12) United States Patent
Beattie et al.

(10) Patent No.: US 6,555,144 B1
(45) Date of Patent: Apr. 29, 2003

(54) CRUSTACEAN BAIT WITH EXTENDED LONGEVITY

(75) Inventors: Michael Beattie, St. Andrews (CA); Keith Were, St. George (CA); Greg Deacon, Vancouver (CA)

(73) Assignee: Nutreco Canada Inc., Vancouver (CA)

( * ) Notice: Subject to any disclaimer, the term of this patent is extended or adjusted under 35 U.S.C. 154(b) by 0 days.

(21) Appl. No.: 09/724,795

(22) Filed: Nov. 28, 2000

(51) Int. Cl.[7] .................................................. A23L 1/10
(52) U.S. Cl. .......................................................... 426/1
(58) Field of Search .............................. 119/204, 51.01, 119/51.04, 230, 242, 212; 426/2, 1; 43/42.06, 44.99

(56) References Cited

U.S. PATENT DOCUMENTS

| | | | | |
|---|---|---|---|---|
| 2,827,376 A | * | 3/1958 | Breuer ........................... 426/1 |
| 3,410,689 A | * | 11/1968 | Nathan ....................... 43/42.06 |
| 3,931,415 A | * | 1/1976 | Larsen et al. .................... 426/1 |
| 4,206,236 A | * | 6/1980 | Orth, Jr. ........................... 426/1 |
| 4,576,821 A | * | 3/1986 | Smith et al. ..................... 426/1 |
| 4,666,717 A | * | 5/1987 | Smith et al. ..................... 426/1 |
| 4,809,455 A | * | 3/1989 | Smart ......................... 43/42.06 |
| 4,826,691 A | * | 5/1989 | Prochnow ........................ 426/1 |
| 4,944,108 A | * | 7/1990 | George et al. .............. 43/42.06 |
| 5,135,744 A | * | 8/1992 | Alexander et al. ........... 424/409 |
| 5,173,316 A | * | 12/1992 | Heycott ........................... 426/1 |
| 5,281,425 A | | 1/1994 | Stribling et al. |
| 5,912,029 A | * | 6/1999 | Spickelmire .................... 426/1 |

FOREIGN PATENT DOCUMENTS

| | | |
|---|---|---|
| WO | WO85/05014 | 11/1985 |
| WO | WO86/06251 | 11/1986 |

* cited by examiner

Primary Examiner—Charles T. Jordan
Assistant Examiner—Judith A Nelson
(74) Attorney, Agent, or Firm—John Russell Uren

(57) ABSTRACT

Bait for attracting crustaceans, particularly lobster. The bait includes a pelletized carrier composed of ingredients intended for long life in sea water. The pelletized carrier is mixed with specific crustacean attractants and a fish oil is added to coat the pellets and attractant and to allow for the timed release of the attractant. In experiments to date, it has been found that the use of the pelletized carrier and attractant together with the fish oil coating has been effective as a bait in attracting lobsters and has an extended life within lobster traps.

19 Claims, 2 Drawing Sheets

CRUSTACEAN BAIT WITH EXTENDED LONGEVITY

This invention relates to crustacean bait and, more particularly, to lobster bait which includes an attractant or attractants and which is intended to have an extended attractant life for lobsters and other commercially fished crustaceans.

BACKGROUND OF THE INVENTION

Presently, lobster fisherman utilise fresh or frozen fish parts or whole fish to bait lobster traps. The fish used are traditionally herring, mackerel, red fish or salmon. The bait works in a satisfactory manner and lobsters and other crustaceans are attracted to the fish bait. However, there are disadvantages inherent in using fresh or frozen fish or fish parts in lobster traps.

First, fresh or frozen bait has a very short life within the traps. Salt water and other opportunistic scavengers will quickly deteriorate the quality of the bait and, after a relative short period depending on the conditions under which the bait is used, the bait will no longer serve as an attractant because of its deterioration. Secondly, the handling of fresh or frozen bait is not convenient. Fresh bait may not be available and, in any event, such bait must first be obtained if the traps are to be baited. Frozen bait will ensure availability but refrigeration is necessary to preserve the frozen bait which is energy consuming. Thirdly, the cost of fresh or frozen baits may vary substantially depending on the time of the fishing season and the availability of the fresh or frozen bait and such cost may sometimes be expensive. Fourthly, traditional baits must be obtained and this sometimes done under directed fishing conditions in which the bait is frozen or salted prior to each fishing season. A reduced demand for fresh or frozen bait would be environmentally attractive, would enhance fish stocks and would allow more efficient use of scarce marine resources.

SUMMARY OF THE INVENTION

According to one aspect of the invention, there is provided bait for a crustacean trap, said bait comprising a pelletized carrier and attractant having ingredients which offer extended life relative to a fish feed, said ingredients forming a pelletized feed, an attractant for attracting said crustaceans and an oil coating for coating said pellets and said attractant, said oil coating allowing a timed release of said attractant thereby to attract said crustaceans.

According to a further aspect of the invention, there is provided a method for attracting crustaceans to a crustacean trap comprising the steps of obtaining a pelletized crustacean bait consisting of a carrier made from relatively long life ingredients, at least one crustacean attractant mixed with said pelletized crustacean bait and an oil coating allowing timed release of said attractant, placing said crustacean bait within said crustacean trap and setting said crustacean trap within water for attracting and trapping said crustaceans.

According to yet a further aspect of the invention, there is provided a method of making a crustacean bait for use within crustacean traps comprising the steps of mixing a pelletized crustacean feed composed of relatively long life ingredients with an oil and at least one crustacean attractant to form said crustacean bait.

According to still yet a further aspect of the invention, there is provided a product produced according to the foregoing method.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

It will initially be stated the crustacean bait herein discussed and described has been initially tested only under controlled laboratory conditions at the present time. Accordingly and although the laboratory tests show promise, it must be borne in mind that the benefits and conclusions stated herein are subject to actual sea trials which are intended to be completed in due course.

Figure 1A:
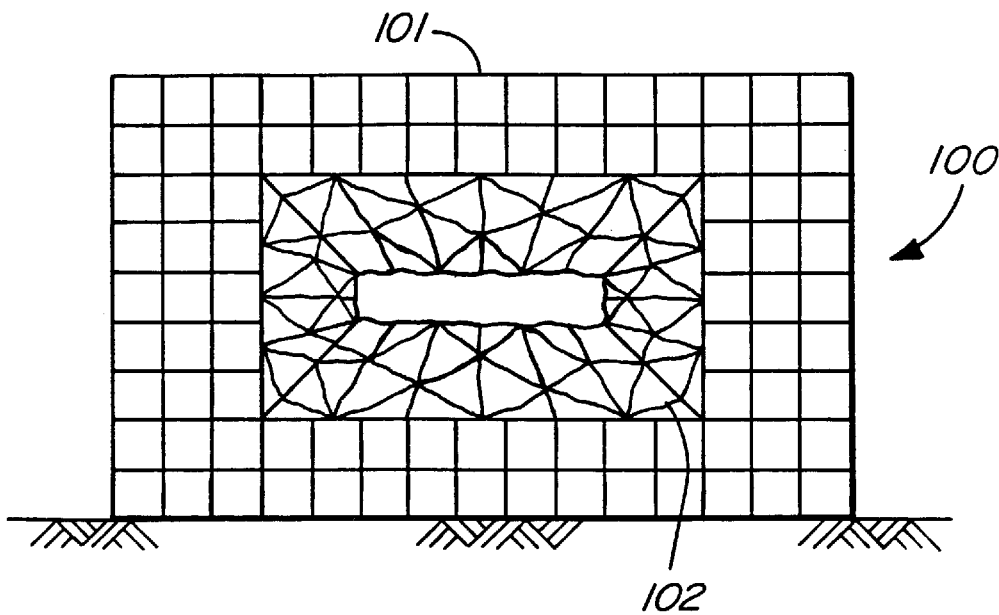
FIGS. 1A and 1B are diagrammatic front and side views, respectively, of a lobster trap with a usual mesh opening and the lobster bait according to the invention being positioned within the trap.
Figure 1B:
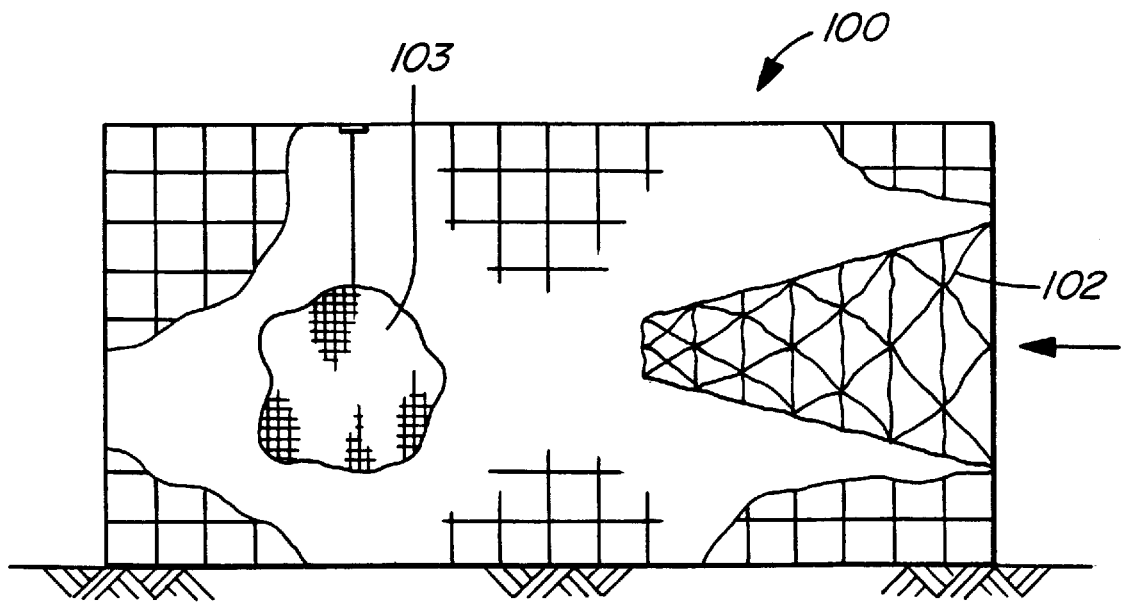

Referring now to the drawings, a lobster trap is generally illustrated at 100 in FIG. 1. The lobster trap 100 used in the laboratory tests had dimensions of 55×55×35 cm and used a plastic coated wire mesh of 40 cm2. A replaceable 6 cm. stretched twine mesh was used for the entranceway 102 which had a 15 cm diameter ring sewn into one end and which formed an entryway for the lobster into the lobster trap 100 as indicated by the arrow in FIG. 1B. The lobster enters the entranceway 102 to gain access to the bait 103 which was placed in a 10×20 cm bait bag made of 3 mm (⅛ inc. mesh) nylon netting which was fastened to the top of the lobster trap 100 as illustrated in FIG. 1B.

The bait 103 used for the lobster trap 100 comprises a pelletized feed carrier which has an attractant mixed with the feed pellets. The pelletized feed carrier is made from ingredients which have an extended life under adverse conditions in salt water relative to ordinary fish feed which, when fed to fishes within an aquacultural environment, will ordinarily pass through the bottom of the enclosure in which such fishes are raised in a matter of minutes and which, therefore, is not intended for an extended life. The ingredients comprising the pellet, therefore, include whole wheat meal in the amount of 50 kg, feather meal in the amount of 50 kg, blood meal in the amount of 12.5 kg, wheat gluten in the amount of 50 kg, poultry meal in the amount of 50 kg, soybean meal in the amount of 50 kg, corn gluten meal in the amount of 50 kg, rework in the amount of 199 kg and Icelandic fish meal in the amount of 34 kg. The ingredients are mixed, extruded and cut into pellets as is well known to those skilled in the art of pelletizing feed.

Figure 2:
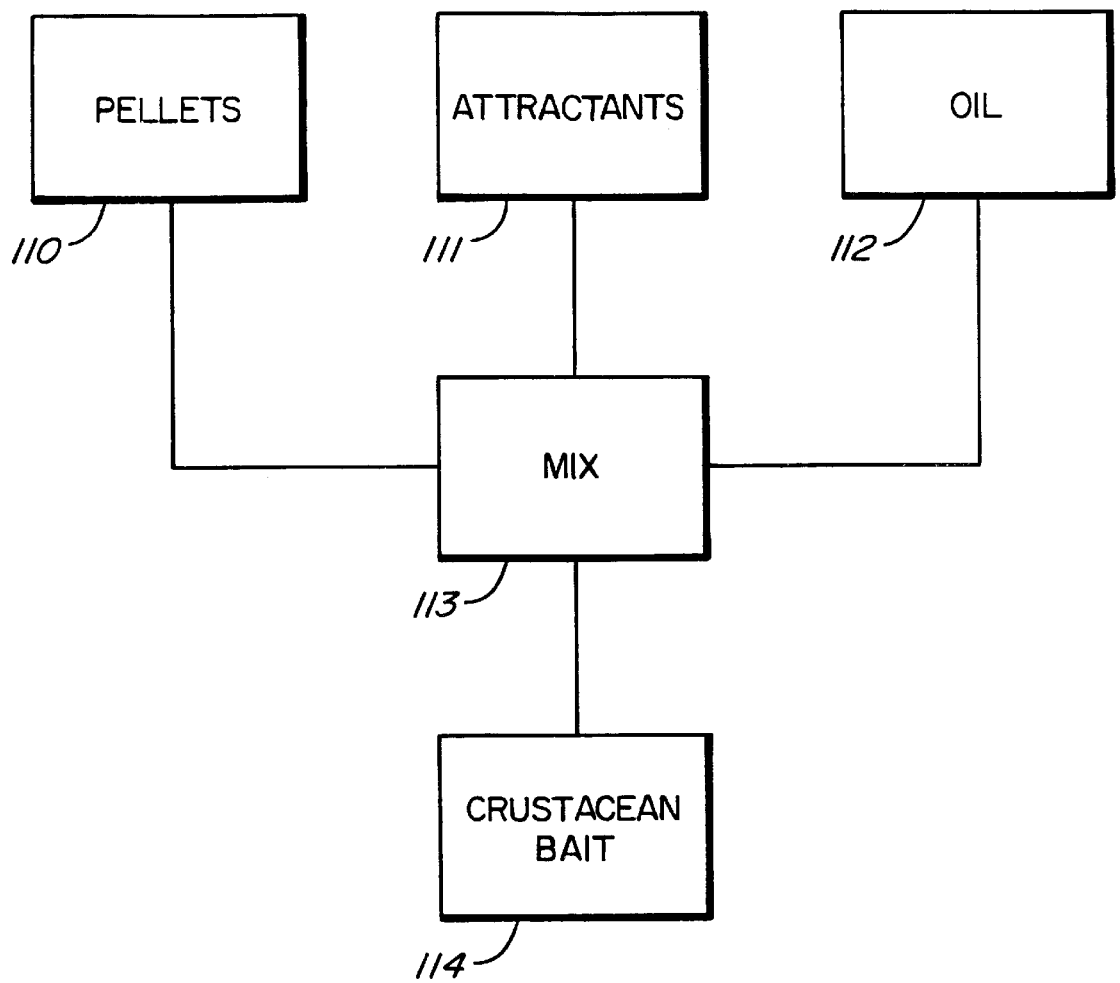
FIG. 2 is a diagrammatic block diagram illustrating the steps for producing the lobster bait according to the invention.

The pellets 110 (FIG. 2) composed specifically for extended life are then mixed with an attractant or attractants 111. Various attractants may be used but, to date, squid meal in the quantity of 1–3 kg. per 250 kg of bait, innosine monophosphate in the quantity of 1.5–4.5 kg. per 250 kg. bait and Aquatract (composed of silica dioxide, shrimp, betaine hydrochloride, glycine, fish autolysate dehydrated) in the quantity of 1–3 kg. per 250 kg. of bait have been used with satisfactory results.

In addition to mixing the pellets of feed with the attractant, a fish oil, conveniently South American Manhaden and/or Icelandic herring oil, is added to the composition to obtain the bait 114. The fish oil 112 is applied through spray nozzles within an enclosed foreburg system at approximately 5–10 liters per 259 kg of bait. It acts to coat the pellets and the attractants 111 and therefore provides a timed release of the attractants 111 over a predetermined time period. It has been found in laboratory conditions that the attractant remained viable for a period of up to twenty-four(24) hours and could, perhaps, remain viable for a much longer period although such extended periods were not measured. Under open water operating conditions which are likely to be far more rigorous, it is anticipated that the longevity of viable timed release of the attractant would be less.

OPERATION

In operation, an appropriate quantity of the lobster feed obtained from the combination of the extended life pelletized feed 110 with the appropriate ingredients herein described, the attractant and/or attractants 111 and the fish oil coating 112 is placed in the mesh baglike container 103 and is fastened to the top of the lobster trap 100. The lobster trap 100 was then placed in position as is illustrated in FIG. 1B.

The fish oil coating 112 (FIG. 2) acts to release the attractant 111 in a timed manner over a predetermined period of time. The attractant 111 is scented by the lobster and the lobster follows the odor to the cage 100. The lobster enters the cage 100 through the mesh entranceway 102 and is unable to exit from the trap 100 as is known.

In the laboratory experiments described, the responses of lobsters were measured for various attractants 111 used with the pelletized bait 110 and fish oil 112 and this response was compared to traditional fresh herring bait. It was found that the responses of lobsters to the crustacean bait 114 compared favorably with that of traditional fresh herring bait. Similarly, the "soak times" or time under water of the bait 114 varied from six(6) to twenty-four(24) hours without a degradation of performance of the attractant 111 in the bait 114.

While the invention has been described as being particularly attractive to lobsters and, indeed, experiments to date have been restricted to American lobsters, it is contemplated that the feed would be similarly useful for other lobsters such as Norway lobsters and other crustaceans such as crabs and particularly including snow crabs and Alaskan King crabs.

Many modifications will readily occur to those skilled in the art to which the invention relates and the specific embodiments described should be taken as being illustrative of the invention only and not as limiting its scope as defined in accordance with the accompanying claims.

We claim:

1. Bait for a crustacean trap, said bait comprising a pelletized crustacean feed composed of a feed having ingredients which offer extended life relative to a fish feed, said ingredients forming a pelletized feed, an attractant for attracting said crustaceans and an oil coating for coating said pellets and said attractant, said oil coating allowing a timed release of said attractant thereby to attract said crustaceans, said feed, said attractant and said oil coating forming said bait all comprising edible components.

2. Bait as in claim 1 wherein said crustaceans include lobsters and crabs and said crustacean feed is a feed for said lobsters and/or crabs.

3. Bait as in claim 1 wherein said oil coating is a fish oil coating.

4. Bait as in claim 3 wherein said fish oil coating is applied through spray nozzles.

5. Bait as in claim 4 wherein said fish oil coating is added to said pelletized feed in a quantity of approximately 5–10 liters per 259 kg of said bait.

6. Bait as in claim 1 wherein said attractants include squid meal, innosine monophosphate and Aquatract.

7. Bait as in claim 6 wherein said squid meal is added in the quantity of 1–3 kg per 250 kg of quantity of said pelletized feed.

8. Bait as in claim 5 wherein innosine monophosphate is added in the quantity of 1.5–4.5 kg. per 250 kg. of quantity of said pelletized feed.

9. Method for attracting crustaceans to a crustacean trap comprising the steps of obtaining a pelletized crustacean bait consisting of a carrier made from relatively long life ingredients, at least one crustacean attractant mixed with said pelletized crustacean bait and an oil coating for said attractant and said carrier, said oil coating allowing timed release of said attractant, placing said crustacean bait within said crustacean trap and setting said crustacean trap within water for attracting and trapping said crustaceans.

10. Method as in claim 9 wherein said crustacean trap is a lobster trap and said crustacean bait is intended to attract said lobsters.

11. Method of making a crustacean bait for use within crustacean traps comprising the steps of mixing a pelletized crustacean feed composed of relatively long life and digestible ingredients with an oil for coating said pellets and at least one crustacean attractant to form said crustacean bait.

12. Method of making a crustacean bait as in claim 11 wherein said oil is a fish oil.

13. Method of making a crustacean bait as in claim 12 wherein said relatively long life ingredients of said pelletized crustacean feed includes wheat meal, feather meal and blood meal.

14. Method of making a crustacean bait as in claim 13 wherein said crustacean attractant includes squid meal, innosine monophosphate and Aquatract.

15. Method of making a crustacean bait as in claim 14 wherein said squid meal is added in the quantity of 1–3 kg. per 250 kg of crustacean feed.

16. Method of making a crustacean bait as in claim 14 wherein said innosine monophosphate is added in the quantity of 1.5–4.5 kg. per 250 kg. crustacean feed.

17. Method of making a crustacean bait as in claim 14 wherein said Aquatract is added in the quantity of from 1–3 kg. per 250 kg. crustacean feed.

18. Product produced according to any one of claims 11 to 17.

19. Method for attracting crustaceans to a crustacean trap comprising the steps of obtaining a pelletized crustacean bait made according to claim 11, placing said crustacean bait within said crustacean trap and setting said crustacean trap within water for attracting and trapping said crustaceans.

* * * * *